United States Patent
Gruber et al.

(10) Patent No.: US 12,379,457 B2
(45) Date of Patent: Aug. 5, 2025

(54) RADAR SYSTEM AND A RADAR METHOD FOR REPLAY RESISTANT RADAR OPERATIONS

(71) Applicant: NXP B.V., Eindhoven (NL)

(72) Inventors: Andreas Gruber, Graz (AT); David Veit, Graz (AT)

(73) Assignee: NXP B.V., Eindhoven (NL)

( * ) Notice: Subject to any disclaimer, the term of this patent is extended or adjusted under 35 U.S.C. 154(b) by 471 days.

(21) Appl. No.: 17/819,662

(22) Filed: Aug. 15, 2022

(65) Prior Publication Data
US 2023/0081840 A1    Mar. 16, 2023

(30) Foreign Application Priority Data
Sep. 10, 2021   (EP) .................... 21196123

(51) Int. Cl.
*G01S 7/02*   (2006.01)

(52) U.S. Cl.
CPC ...................... *G01S 7/02* (2013.01)

(58) Field of Classification Search
CPC ......................................... G01S 7/02
See application file for complete search history.

(56) References Cited

U.S. PATENT DOCUMENTS 5,486,830 A  * 1/1996 Axline, Jr. ............. G01S 13/74
                                                                342/43
5,583,512 A    12/1996 McEligot
(Continued)

FOREIGN PATENT DOCUMENTS

GB    2268350 A    1/1994

OTHER PUBLICATIONS

El-Khamy, S.E., "Improved radar target identification and discrimination by matched frequency hopping spread spectrum (MFH/SS) signals and clipped radar-signature", Proceedings of ISSSTA '95 International Symposium on Spread Spectrum Techniques and Applications, Sep. 25, 1996.

(Continued)

*Primary Examiner* — William Kelleher
*Assistant Examiner* — Hailey R Le

(57) ABSTRACT

There is described a radar system (100) and a corresponding method, the radar system (100) comprising i) a control unit (110), configured for generating a code (C) comprising a sequence of code symbols (211), wherein generating the code (C) comprises randomly selecting a plurality of code symbols (211) from a code symbol pool (310) comprising a plurality of code symbols (211), ii) a transmitter (120), configured for generating a signal (S) from the code (C), and further configured for transmitting the signal (S), iii) a receiver (130), configured for receiving an echo (E) of the signal (S), and iii) a correlator (140), configured for correlating each code symbol of the code (C') of the received echo (E) of the signal (S) to a corresponding symbol template (R) associated with the correlator (140); wherein the radar system (100) is further configured for synchronizing the symbol template (R) to the code (C) of the signal (S). There is further described a method of using a sequence of randomly selected code symbols (211) in a radar application, in particular an UWB-based radar application, to prevent replay attacks.

20 Claims, 3 Drawing Sheets

(56) References Cited

U.S. PATENT DOCUMENTS

| | | | |
|---|---|---|---|
| 6,031,485 | A | 2/2000 | Cellai et al. |
| 6,392,588 | B1* | 5/2002 | Levanon ............... G01S 13/288 |
| | | | 342/202 |
| 8,135,952 | B2 | 3/2012 | Bretheim |
| 10,698,099 | B2 | 6/2020 | Nicolls |
| 2017/0251014 | A1* | 8/2017 | Eisen ................. G06Q 20/4016 |
| 2018/0254925 | A1* | 9/2018 | Dutz .................... H04B 1/7183 |
| 2019/0378356 | A1* | 12/2019 | Fang ....................... G07C 5/008 |
| 2020/0191939 | A1* | 6/2020 | Wu ......................... G01S 7/354 |
| 2022/0206132 | A1* | 6/2022 | Bialer .................... G01S 13/87 |

OTHER PUBLICATIONS

Govoni, M.A., "Radar spectrum spreading using advanced pulse compression noise (APCN)", 2014 IEEE Radar Conference, May 19-23, 2014.

Lukin, K., "Chaos-based spectral keying technique for design of radar-communication systems", 2019 Signal Processing Symposium (SPSympo), Sep. 17-19, 2019.

Rodriguez-Garcia, P., "Real-Time Synthesis Approach for Simultaneous Radar and Spatially Secure Communications from a Common Phased Array", 2019 IEEE Radio and Wireless Symposium (RWS), Jan. 20-23, 2019.

Su, N., "Secure Radar-Communication Systems With Malicious Targets: Integrating Radar, Communications and Jamming Functionalities", IEEE Transactions on Wireless Communications, vol. 20, No. 1, Jan. 2021.

\* cited by examiner

RADAR SYSTEM AND A RADAR METHOD FOR REPLAY RESISTANT RADAR OPERATIONS

CROSS-REFERENCE TO RELATED APPLICATIONS

This application claims the priority under 35 U.S.C. § 119 of European Patent application no. 21196123.0, filed on 10 Sep. 2021, the contents of which are incorporated by reference herein.

TECHNICAL FIELD

The present disclosure relates to a radar system, in particular to a radar system capable of using UWB technology. Furthermore, the disclosure relates to a method of transmitting and receiving a radar signal in a radar system. The present disclosure also relates to a use of a random sequence of symbols in a radar application. Thus, the present disclosure may refer to the technical field of radar operations.

TECHNICAL BACKGROUND

The main advantages of a radar system (radio detection and ranging system) compared to other sensors may be seen in its weather and day-light independence, its range-independent resolution and its sensitivity to small displacements and motions. The core components of a radar system can include i) a wave (or waveform) generator, ii) a transmitter bringing radio frequency signals to a transmitting antenna (which radiates the electromagnetic waves into space), iii) a receiving antenna collecting the waves reflected by objects, and iv) a receiver, usually amplifying the weak signals and making them available to analogue and digital processing. The accuracy of radar can be in the order of meters down to fractions of the wavelength. These properties can make radar a useful tool in a wide array of applications, including civil as well as defense applications, such as autonomous driving or unmanned vehicles in general, or object and threat detection.

However, common radar systems may be susceptible to false signals, for example generated by record and replay. One example for the generation of such false signals may be DRFM (Digital Radio Frequency Memory), which is readily available at reasonable cost and can record and replay radar signals with any target modulation to generate non existing targets in the radar system. Detection of false signals may for example lead to accidents, causing harm to material (e.g. to a vehicle) and possibly to lives.

Conventionally, radar systems use, for example, N repetitions of a code symbol of the length L as their radar signal. The receiver correlates the received echoes with the known code symbol (pulse compression) and adds up the correlation result of each symbol repetition (coherent integration). Due to the periodic repetition of the same symbol, the radar signal is susceptible to false signals generated by record and replay (e.g. by digital radio frequency memory, DRFM). With careful synchronization to the transmitted radar signal, even targets closer than a DRFM position can be generated with minor losses of $$20 * \log_{10}\left(\frac{N-2}{N}\right) (-0.02 \text{ dB for } N = 512),$$

for N=512), since a delayed symbol matches exactly all subsequent symbols due to the periodic repetition of the same symbol.

Depending on the use case of the radar system, this may cause significant security and safety threats. Exemplary conventional methods used in conventional radar systems to prevent or detect false targets generated by DRFM replay are staggered pulse repetition frequency (PRF), changing frequency modulated continuous wave (FMCW) sweep parameters for each chirp.

Hence, there may be a need for providing a robust radar system which is not susceptible to false signals (and thus resistant to replay attacks).

OBJECT AND SUMMARY OF THE DISCLOSURE

It is an object of the present disclosure to provide a robust and replay-attack resistant radar system, which is particularly capable of efficiently distinguishing real signals from false signals.

In order to achieve the object defined above, a system, a method, and a use according to the independent claims are provided.

According to an aspect of the present disclosure, there is described a radar system, comprising:
  i) a control unit, configured for generating a code comprising a sequence of code symbols, wherein generating the code comprises (pseudo-) randomly selecting a plurality of code symbols from a code symbol pool comprising a plurality of code symbols,
  ii) a transmitter, configured for generating a signal from the code, and further configured for transmitting the signal (hereby, the control unit and the transmitter may be implemented as a single device or as separate devices);
  iii) a receiver, configured for receiving an echo of the signal, and
  iv) a correlator, configured for correlating each code symbol of the code of the received echo of the signal to a code symbol of the code of the signal via a corresponding symbol template associated with (and, for example, stored in) the correlator (hereby, the correlator and the receiver may be implemented as a single device or as separate devices).

Further, the radar system is configured for synchronizing (updating) the symbol template to the code of the signal.

According to a further aspect of the present disclosure, there is described a radar method, comprising:
  i) generating a code comprising a sequence of code symbols, thereby randomly selecting a plurality of code symbols from a code symbol pool comprising a plurality of code symbols;
  ii) generating a signal from the code;
  iii) transmitting the signal;
  iv) receiving an echo of the signal;
  v) correlating each code symbol of the code of the received echo of the signal to a code symbol of the code of the signal via a corresponding symbol template; and
  vi) synchronizing the symbol template to the code of the signal.

According to a further aspect of the present disclosure, there is described the use (method of using) of a sequence of randomly selected code symbols in a radar application, in particular an UWB-based radar application, to prevent replay attacks.

In the context of the present disclosure, the term "control unit" may particularly refer to any hardware component like a processor or a component thereof, a non-transitory computer readable computer medium, or a computer or any other computing device and any software (code or program) stored therein, capable of executing orders and of enabling the generation, processing, coding, and decoding of electric (binary and non-binary) signals that contain information and direct the operation of other units.

In the context of the present disclosure, the term "(code) symbol" may particularly denote a (discrete) piece of information (or data) that is contained in a (radiofrequency) signal (i.e. waves in the electromagnetic spectrum). A symbol may also be called a character or a string (of characters). In particular on the side of a control unit and/or other electronic components, a code symbol may be represented by bits, and may be represented in the signal.

For example, as a pulse or as an intermission of two pulses, as waves with certain (changing) properties like amplitude, frequency, phase, or shift of at least one of amplitude, frequency, and phase. A symbol may have a (predefined) length, for example two or more bits (and, correspondingly, for example two or more pulses of the same length). Hence, for example, the phases, frequencies, or amplitudes of the electromagnetic waves that comprise a signal may be assigned a unique pattern of (binary) bits. Each phase, frequency or amplitude may encode an equal number of bits. This number of bits may comprise the code symbol that is represented by the particular phase, frequency, or amplitude.

In the context of the present disclosure, a symbol may be engineered, in particular such that it has optimized cross-correlation and/or auto-correlation properties and may be added to a symbol pool of code symbols with similar properties. However, it may also be possible to (automatically) generate symbols based on an algorithm, e.g. by means of a computer (or computer program). The symbol pool may be compared to an alphabet, wherein a code symbol resembles a letter.

Consequently, a sequence of (the same and/or different) code symbols (in particular with the same length) makes up what is, in the context of the present disclosure, denoted a "code". The code may for example be put together by concatenating different code symbols according to an output of a random number generator.

In the context of the present disclosure, the term "transmitter" may particularly refer to a hardware component and/or to program components, configured for generating a (radiofrequency) signal from a code, in particular also configured for bringing the radiofrequency signal(s) to a transmit antenna which radiates the signal in form of electromagnetic waves into space.

In the context of the present disclosure, the term "receiver" may particularly refer to a hardware component and/or to program components, configured for receiving an echo of the signal (i.e. an echo of the radiofrequency signal in form of electromagnetic waves sent from the antenna). An echo may be described as the reflection of the electromagnetic waves, which is created when the electromagnetic waves hit an object.

For reasons of conciseness, the terms "signal", "echo", and "code" may be used interchangeably, for example "sending the signal" and "sending the code" or "receiving the echo" and "receiving the code", respectively, may be considered the same and will be understood accordingly.

In the context of the present disclosure, the term "correlator" may particularly refer to a hardware component and/or to program components, configured for enabling the correlating (or matching, comparing) of a code symbol, in particular a received code symbol, and another code symbol, in particular a transmitted code symbol, via a symbol template.

In this context the term "symbol template" may be conceived in a similar way as a "(code) symbol" itself. In other words, a symbol template may also be denoted as a (discrete) piece of information (or data) which is represented, e.g., by bits and which corresponds to or correlates with a particular symbol. Descriptively speaking, a symbol template may for example comprise the same information (e.g. an amount and order of bits) as a code symbol.

In the context of the present disclosure, the term "UWB" may particularly refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth, thus enabling pulse-position or time modulation. The range of UWB may be for example in the range of tens of meters. A UWB distance determination system may employ the Time-of-Arrival principle to determine the distance between UWB communication devices such as a mobile device and anchor devices (on a target device).

According to an exemplary embodiment, the present disclosure may be based on the idea that a robust and replay-attack resistant radar system may be provided, when a transmitter transmits a code, wherein code symbols (from a code symbol pool) are randomly selected, and wherein the corresponding receiver/correlator is synchronized (updated) with a correlation template corresponding to the code.

Conventionally, radar systems use, for example, N repetitions of a code symbol of the length L as their radar signal (in other words: repetitions of one and the same signal are used).

It has been surprisingly found by the inventors of the present disclosure that it may be one possibility to overcome issues of the prior art (see discussion above) through the usage of, in particular very long, pseudo-random code sequences. According to an embodiment of the present disclosure, the radar signal is generated from a pool of existing code symbols, wherein each code symbol is e.g. assigned a number. The sequence of the code symbols, which make up a code, is determined e.g. by using a deterministic random number generator based on a crypto key. The code is sent, symbol by symbol, into space and the echo of this signal is received by a corresponding receiver. The receiving end of the radar system may be able to correlate a received code symbol with a transmitted code symbol via a symbol template in order to determine whether a received symbol has been transmitted by the corresponding transmitter of the radar system, or whether it is related to a false target.

Since the sequence of code symbols is pseudo-random and only known to the proprietary radar system, deceiving the radar system by record and replay may not work anymore. Hence, an (essentially) replay-attack resistant radar system may be provided using the described approach. It may be a further advantage of the described radar system that, unlike other methods of preventing signal replay, which methods may only be applied, e.g., to low-PRF pulse radar systems or FMCW radar systems, the proposed principle is also suitable for use in a (high-PRF) UWB-waveform radar system.

DESCRIPTION OF EXEMPLARY EMBODIMENTS

In the following, further exemplary embodiments of the system, the method, and the use will be explained.

According to an exemplary embodiment, each code symbol of the plurality of code symbols comprises a sequence of encoded bits with a predefined length. According to a further exemplary embodiment, all code symbols have the same length. In particular, the length may be at least two bits, more in particular at least three bits. According to a further embodiment, the length may be more than 100 bits. A wide range of sequence lengths may ensure that a symbol pool may comprise a very large amount of symbols, for example 10 to 20, or more than 20, in particular more than 100 symbols. Furthermore, by increasing the length, more symbols with pronounced, in particular optimized and/or (essentially) ideal, cross-correlation and/or auto-correlation properties may be provided.

According to a further exemplary embodiment, the code symbols of the code symbol pool differ from each other. In other words, a code symbol may have different properties, but in order to provide a pool of code symbols, the code symbols contained therein differ from each other in at least one of the properties. Hence, a pseudo-random sequence of different code symbols may be generated because each code symbol of the code symbol pool is unique with respect to the other code symbols of the code symbol pool. This would not be possible, if the symbols had only the same properties.

According to a further exemplary embodiment, the code symbols of the plurality of code symbols are based on one of a binary system, a ternary system, and a higher order system. For example, if the system is a binary system comprising using for example "1" or "−1" as information, this information could be represented in the radar signal by a 180° phase shift with respect to each other. If the information is of ternary nature (for example "1", "0", and "−1") an additional representation could for example be a missing pulse. If the information is of higher order, further phase modulation (e.g. "0"=0°, "1"=90°, "2"=180°, "3"=270°, etc.) could be an option.

According to further exemplary embodiment, the sequence of code symbols comprises at least one pair of code symbols, and the at least one pair of code symbols comprises code symbols, in particular two different code symbols, with pronounced/optimized (in particular essentially ideal) cross-correlation functions/properties and/or auto-correlation functions/properties. Since the sequence of code symbols may be based on the outcome of a random number generator, in theory, the code may comprise a sequence of N repetitions of the same symbol. However, symbols of the code symbol pool may also appear more than once in a code sequence, or never. Different symbols with a cross-correlation of zero for every time shift may be called orthogonal and may in some embodiments be preferred.

Therefore, according to an embodiment of the invention, the code may comprise at least two code symbols which are orthogonal with respect to each other. However, there may be no known code to provide orthogonality and perfect autocorrelation simultaneously. Therefore, symbols may have to be engineered depending on use case requirements. In general, there is always a tradeoff between cross-correlation and auto-correlation properties of the code symbols.

As good auto-correlation properties may be needed for normal radar operation to avoid so-called ghost-targets from time-sidelobes, often the cross-correlation properties of such code symbols may not be very good. If the cross-correlation properties of the used code symbols are not perfect, another target signal present may introduce an increased noise floor at a correlator output.

Nevertheless, coherent integration may reduce said noise floor. The output of an auto- and cross-correlation can be normalized using two input vectors such that every sample of an output vector is in a range between zero and one. Zero may resemble completely uncorrelated signals (i.e. code symbols) and one may resemble a perfect correlation, which may be achieved if the signals (i.e. code symbols) are identical.

Therefore, according to further exemplary embodiments of the present disclosure, the cross-correlation properties between different code symbols may preferably be as close to (substantially) zero as possible while the autocorrelation properties of the code symbols (or code) may preferably have a single sample with a value of (substantially) "one" in a middle of the output vector. The afore-mentioned normalization step may, however, be omitted to save computing time.

According to a further exemplary embodiment, the radar system further comprises a deterministic random number generator, configured for generating the sequence of code symbols in a pseudo-random manner based on a cryptographic key. For example, the code symbols of the pool of code symbols (e.g. consisting of up to 27 or more code symbols) are each assigned a number. The deterministic random number generator then creates, as an output, a sequence of numbers. To generate the code, the code symbols may be concatenated based on the output of the deterministic random number generator and based on the number assigned to the respective code symbols, e.g. up to 512 symbols or more per code. Because of this pseudo-random process, it may not be possible that the code sequence is known to entities other than the proprietary radar system, which may make the radar system replay resistant and hence safe.

According to a further exemplary embodiment, the deterministic random number generator uses AES (Advanced Encryption Standard). This may provide a very high security standard. However, other symmetrical or unsymmetrical encryption algorithms may be used as well.

According to further exemplary embodiment, the symbol template corresponds to a first code symbol of the plurality of code symbols, and a further symbol template corresponds to a subsequently transmitted second code symbol of the plurality of code symbols. Descriptively speaking, the code may be generated based on a sequence of code symbols as has been described in detail above.

In an example, the symbols are transmitted on a symbol per symbol basis (a code symbol followed by a subsequent code symbol) as signals in the form of electromagnetic waves, the echoes of which are received by the receiver. The echo of a first signal (corresponding to a first code symbol) is received before the echo of a further signal (corresponding to a further code symbol) transmitted subsequently to the first signal. In order to be able to detect whether a target is false, the radar system has to be able to identify a received code symbol to its corresponding transmitted code symbol. Therefore, for a pair of corresponding transmitted and received code symbols, there is one symbol template which the radar system (in particular the correlator) can use to correlate (i.e. determine a correlation of) the transmitted and received code symbols. Likewise, for the subsequent pair of corresponding transmitted and received, further code symbols, there is a further symbol template which the radar system (in particular the correlator) can use to correlate the transmitted and received further code symbols.

According to an exemplary embodiment, the radar system is further configured for synchronizing the symbol templates to the code of the signal transmitted by the transmitter by i) associating the symbol template with the correlator before an echo of the first code symbol arrives at the receiver, and by ii) associating the further symbol template with the correlator before a further echo of the subsequent second code symbol arrives at the receiver, such that synchronizing the symbol templates to the code of the signal is carried out in a one-code-symbol-at-a-time manner.

Associating the symbol may comprise loading the symbol template into and/or storing it in the correlator (and/or the receiver). In other words, as has already been described in detail above, symbols are transmitted on a symbol-per-symbol basis, i.e. in the form of electromagnetic waves. Likewise, the symbol templates may be synchronized on a symbol per symbol basis, meaning that when the transmitter starts to transmit a code, the correlation template needs to be updated so that echoes from the currently transmitted code symbol can be correlated. Hence, the correlator does not necessarily have to be able to (although it may be configured to) store the symbol templates for all or most of the code symbols of the complete code at one time. This has the benefit and technical effect that a correlator does not require large memories, very high computing power, and does not consume excessively large quantities of energy and time (in terms of latency). It has the further technical effect that echoes from a previous code symbol are rejected (e.g. overrange echoes and malicious delayed signals). Descriptively speaking, if a record and replay device were to record and replay a previous signal, the radar system would not be able to correlate it to a transmitted symbol because the symbol template for the subsequent symbol would already be loaded into the correlator. Hence, the recorded and replayed signal would not be detected as an echo of a transmitted signal, but it would be detected as a false signal (i.e. false target).

According to an exemplary embodiment, the radar system is further configured for digitally modulating a radar signal, in particular wherein the digital modulation is one of phase-shift keying (PSK), frequency-shift keying (FSK), amplitude-shift keying (ASK), and in some cases also quadrature amplitude modulation (QAM). In general, the radar system may be configured for performing higher order modulation (and/or demodulation). This has the advantage that the signal may be adapted to different cases of applications of the radar system. Furthermore, the code (information) may be efficiently and safely impressed on a carrier signal in any radar application using a carrier signal.

According to an exemplary embodiment, the receiver further comprises a gating functionality, configured for sorting out an echo having a delay time $\tau$ which exceeds a maximum allowed delay time $\tau_{max}$. The maximum allowed delay time may for example be one symbol duration. This may have the technical effect that, e.g. for safety reasons, an echo that exceeds $\tau_{max}$ is rejected by the receiver, even if it may be the echo of a transmitted signal echoed from a real target. However, this may also prevent that a recorded and replayed (malicious) signal is detected by the radar system. Since record and replay usually takes some time, the recorded and replayed signal usually has a delay with respect to an assumed time of arrival of the real echo. Hence, the gating function may not allow the signal through, thereby preventing the radar system from detecting a false target.

According to an exemplary embodiment, the radar system is one of a pulse radar system and continuous wave radar system, in particular a phase modulated continuous wave radar system, or a frequency modulated continuous wave radar system, wherein further in particular, the radar system is configured for transmitting and receiving ultra-wide band (UWB) signals and echoes. In particular, when the radar system is configured for using UWB, it may further be configured for performing pulse-phase modulation.

According to yet another exemplary embodiment, the code symbol pool comprises two or more, in particular four or more, further in particular eight or more, further in particular twenty or more different code symbols. The more code symbols are comprised by the symbol pool, the safer the radar system may become. For example, a likelihood of a record and replay device to record a sequence of signals and then correctly guess the next signal and/or to replay a true signal without exceeding a delay time limit decreases with more code symbols being comprised by the symbol pool.

The aspects defined above, and further aspects of the present disclosure are apparent from the examples of embodiment to be described hereinafter and are explained with reference to these examples of embodiment. The disclosure will be described in more detail hereinafter with reference to examples of embodiment to which the disclosure is, however, not limited.

BRIEF DESCRIPTION OF THE DRAWINGS

The illustrations in the drawings are schematic. In different drawings, similar or identical elements are provided with the same reference signs.

DETAILED DESCRIPTION OF THE DRAWINGS

Figure 1:
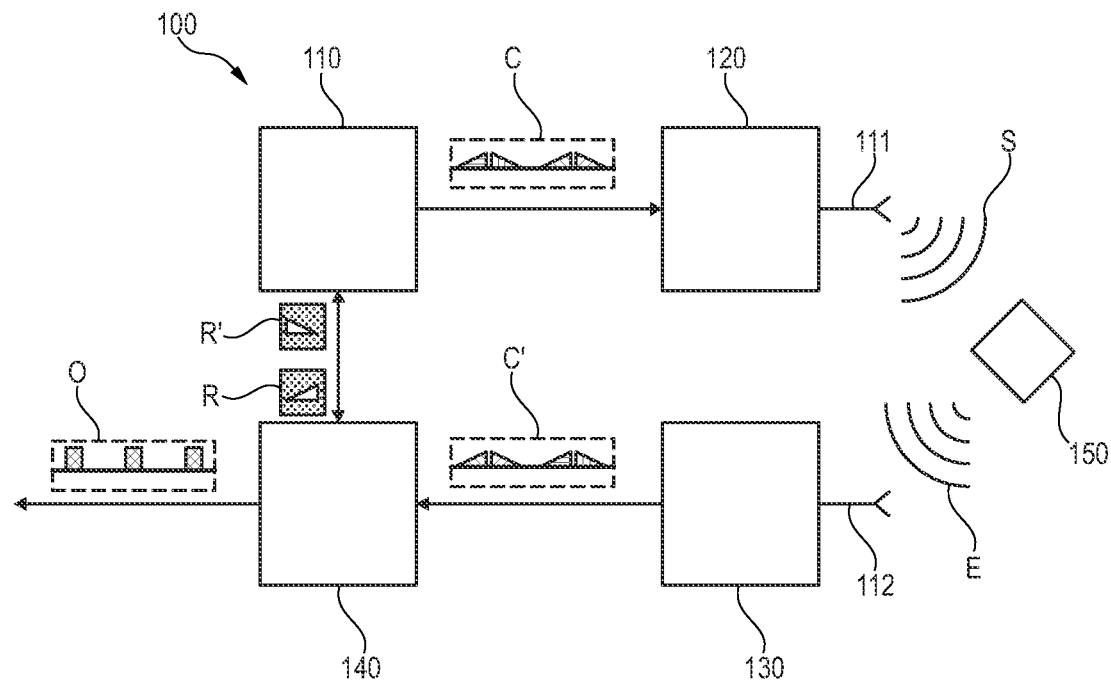
FIG. 1 is a schematic illustration of a radar system, according to an exemplary embodiment of the present disclosure.

FIG. 1 shows a schematic illustration of a radar system 100, according to an exemplary embodiment of the present disclosure. The radar system 100 comprises a control unit 110, which is configured for generating a code C. The radar system 100 further comprises a transmitter 120, configured for generating a signal S from the code C, and further configured for transmitting the signal S via an antenna 111, and a receiver 130, configured for receiving an echo E of the signal S via a further antenna 112. There is also shown a correlator 140, configured for correlating each code symbol of the code C' of the received echo E of the signal S to a corresponding symbol template R associated with the correlator 140. Even though the control unit 110 and the transmitter 120 are shown separately, both functionalities can be implemented in a common device. The same holds true for the receiver 130 and the correlator 140. Further, transmitter 120 and receiver 130 can be separate devices or can be implemented in one and the same device (e.g. a smart phone, a car key, an airplane, etc.)

The radar system 100 is configured for synchronizing the symbol template R to the code C of the signal S. There is also shown symbol template R, which can be used to correlate a received symbol with a transmitted code symbol 211. The further symbol template R' is used to correlate a subsequently received code symbol with a subsequently transmitted second code symbol 211. The symbol templates R, R' may be synchronized between the control unit 110 and the correlator 140 (and/or between a transmitter device and a receiver device), which is symbolized by the arrow between the control unit 110 and the correlator 140. In other words, the symbol template R, R' may be associated with the correlator 140, e.g. loaded or transferred into and stored in the correlator, by any suitable means.

In particular, as has already been described with respect of embodiments of the present disclosure, the radar system is configured for synchronizing the symbol templates R, R' on a symbol per symbol basis. Descriptively speaking, a first symbol 211 is transmitted by the transmitter 120 as signal S and then—ideally—received as an echo E by the receiver 130. Shortly before it is received, the symbol template R (corresponding to the first code symbol 211) is loaded into the correlator 140. In the meantime, the subsequent echo E containing the subsequent code symbol may be arriving at the receiver 130. Shortly before the reception of the subsequent echo E, the further symbol template R' (corresponding to the subsequent code symbol) is uploaded into the correlator 140 (i.e. synchronized).

The radar system is further configured, as is exemplary shown in FIG. 1, to produce an output signal (in particular a correlator output O), which may, for example, be a visual output, or in general, any digital or analogue output for further processing. For example, once the echo has been received, it may be demodulated, e.g. by a higher order digital modulation method according to exemplary embodiments. The resulting signal represents a symbol, which is then correlated by the correlator. If the result of the correlation is "true", i.e. the received symbol is from an echo of a true target contrary to a false target, the correlator (or another hardware component or program component of the radar system, which is not shown) may produce an output signal, which may for example, be displayed on a graphical user interface.

Figure 2:
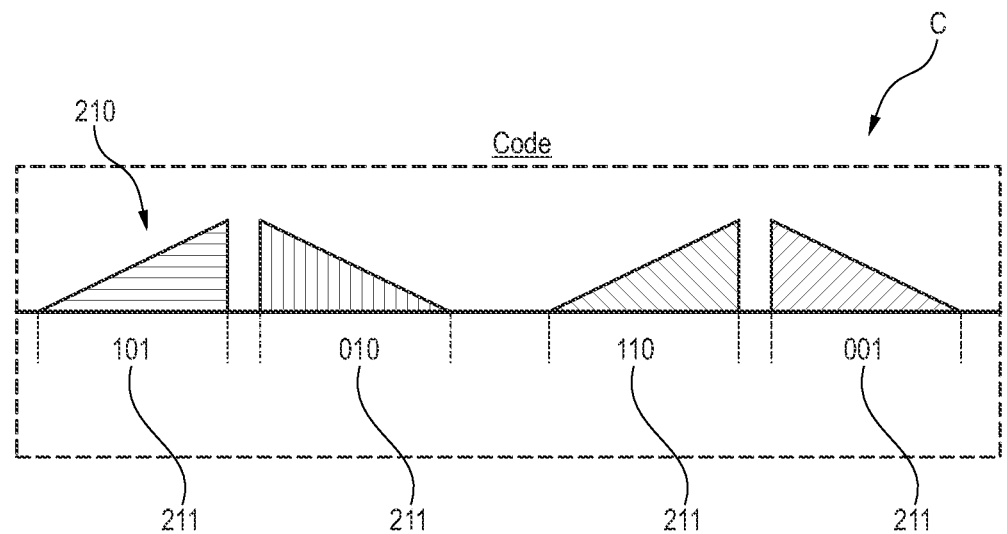
FIG. 2 illustrates a code according to an exemplary embodiment of the present disclosure.

FIG. 2 illustrates a code C, according to an exemplary embodiment of the present disclosure. The code C comprises a sequence 210 of four code symbols 211, which are represented in FIG. 2, for reasons of descriptiveness, by triangles with different cross hatch, meaning that the exemplary symbols are different from each other. This may also be taken from the exemplary bit sequence of each code symbol 211. Hence, in accordance with an embodiment of this disclosure, each code symbol 211 of the plurality of code symbols 211 comprises a sequence of encoded bits with a predefined length, and all code symbols 211 have the same length, i.e. three bits. In this case, the code symbols 211 are based on a binary system, represented by "1" (e.g. corresponding to any pulse of a certain length) and "0" (e.g. corresponding to no pulse, i.e. a break of the same length as the pulse).

Figure 3:
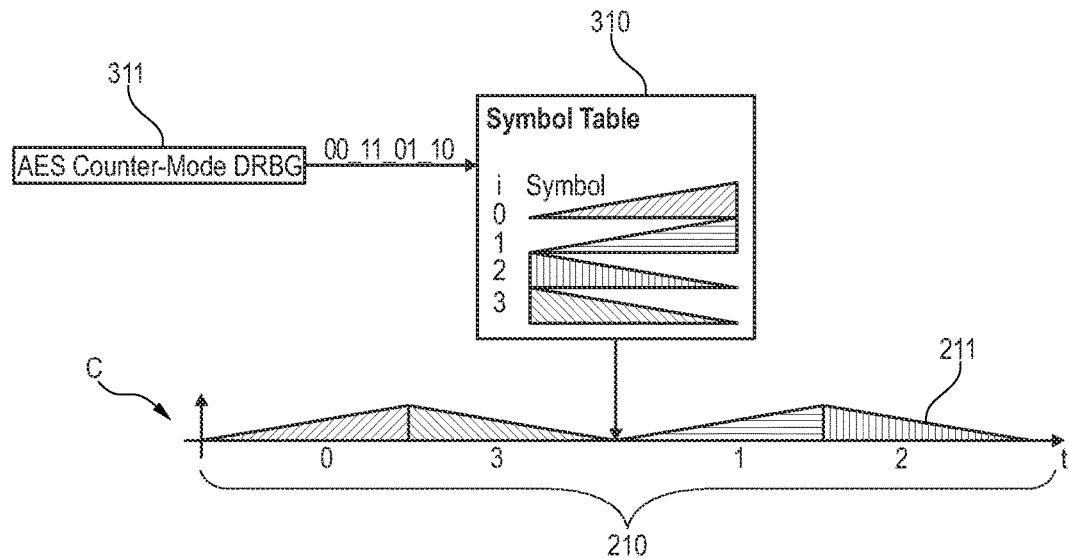
FIG. 3 illustrates a method of generating a code according to an exemplary embodiment of the present disclosure.

FIG. 3 illustrates a secure method of generating a code C, according to an exemplary embodiment of the present disclosure. Generating the code C according to the depicted embodiment comprises randomly selecting a plurality of code symbols 211 from a code symbol pool 310 comprising a plurality of code symbols 211. This sequence of randomly selected code symbols 211 can be used in a radar application, in particular an UWB-based radar application, to prevent replay attacks. As can be taken from FIG. 3, the radar system 100 comprises an AES-based deterministic random number generator (in particular a deterministic random bit generator, DRBG). Each code symbol of the code symbol pool 310 is assigned a numeric value, e.g. decimal numbers 0, 1, 2, 3. The binary output of the DRBG is 00-11-01-10, corresponding to the pseudo-random sequence 210 of the depicted code C, i.e. 0-3-1-2. Thus, the exemplary code C comprising four different code symbols in a pseudo-random sequence is generated in a pseudo-random manner, for example based on a cryptographic key and using a DRBG.

Figure 4:
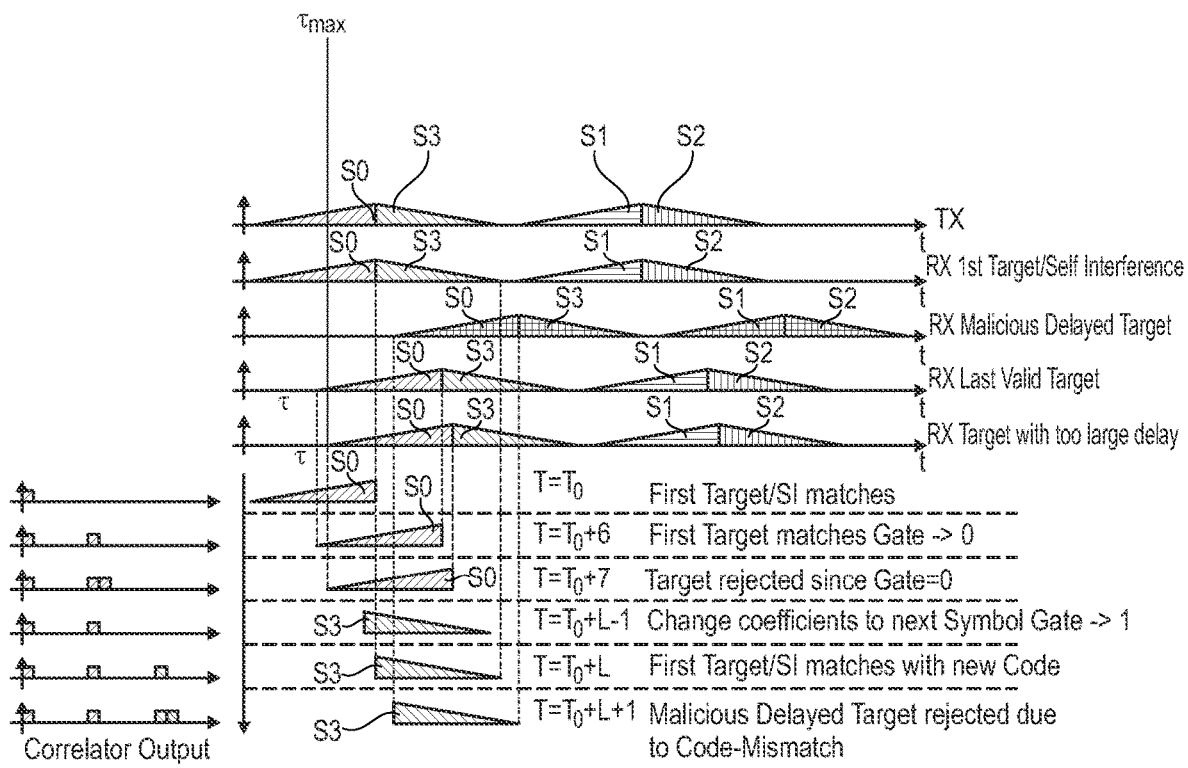
FIG. 4 shows timing diagrams of a receiver, a correlator update, and suppression of malicious delayed targets, according to exemplary embodiments of the present disclosure.

FIG. 4 is a timing diagram of a receiver 130 and shows a correlator update and suppression of malicious delayed targets, according to exemplary embodiments of the present disclosure. The first five rows (from top to bottom) each show a signal S comprising sequence 210 of four code symbols as have been described before with reference to FIG. 3, over time t. Each code symbol hence has a code symbol length (and thus a signal length). The first row (TX) shows the transmitter signal. The second row (RX 1st Target/Self interference) shows the same code symbols as received by the receiver 130. In the third row (RX Malicious Delayed Target), the same code symbols 211 and sequence 210 are depicted, however with a significant time delay, represented by a shift to the right on the time axis. This could be the case during a record and replay attack. The fourth row (RX Last Valid Target) shows a delayed echo E having a delay time $\tau$, which is however still within the maximum allowed delay time $\tau_{max}$. The fifth row (RX Target with too large delay) shows a delayed echo E having a delay time $\tau$, which exceeds the maximum allowed delay time $\tau_{max}$.

In the case that the receiver 130 comprises a gating functionality, configured for sorting out an echo E having a delay time $\tau$ which exceeds a maximum allowed delay time $\tau_{max}$, the signals as depicted in the third and fifth row of FIG. 4 would be rejected. Rows six to eleven (from top to bottom), represent the correlation of the code symbols.

There is further shown a correlator output, wherein the code symbols are shown as discrete signals. In the sixth row (First Target/SI matches), the symbol template corresponding to the first symbol (S0) is loaded. Since there is no delay, the first code symbol (S0) is detected and output. The seventh row (Last target matches) corresponds to the fourth row. Because the delay time $\tau$ is still within the maximum allowed delay time $\tau_{max}$, the code symbol is detected. The eight row (Target rejected since Gate=0) corresponds to the fifth row. The target is rejected by the gate functionality because the delay time $\tau$ exceeds the maximum allowed delay time $\tau_{max}$. At this point, the correlator output shows two signals: the two detected targets produce a signal, the rejected target produces no signal. The nineth row (Change coefficients to next symbol) shows that the correlator is updated (synchronized), i.e. a new symbol template is uploaded shortly before the start of the next received symbol (Symbol S3 in the first row TX). In general, the update of the new symbol template should take place before the transmission of the shortest possible target (most often the self-interference), to ensure that this target is correlated with the correct symbol template. The tenth row (First Target/SI matches with new code) corresponds to the second row. Since there is no delay, the second code symbol (S3) is detected and output. Lastly, in the eleventh row (Malicious Delayed Target rejected due to Code-Mismatch), no correlator output O is produced, because the corresponding signal of the third row is delayed, and/or cannot be correlated to the transmitted signal S3 because of a mismatch with the correlator template.

In this context, it is mentioned that if a false target would be placed (i.e. sent or replayed) using the correct code symbol and with a delay time $\tau$ within the maximum allowed delay time $\tau_{max}$, it would not be detected as false target. However, this single occurrence of perfect match would be averaged out by the coherent integration of all code symbols used.

Figure 5:
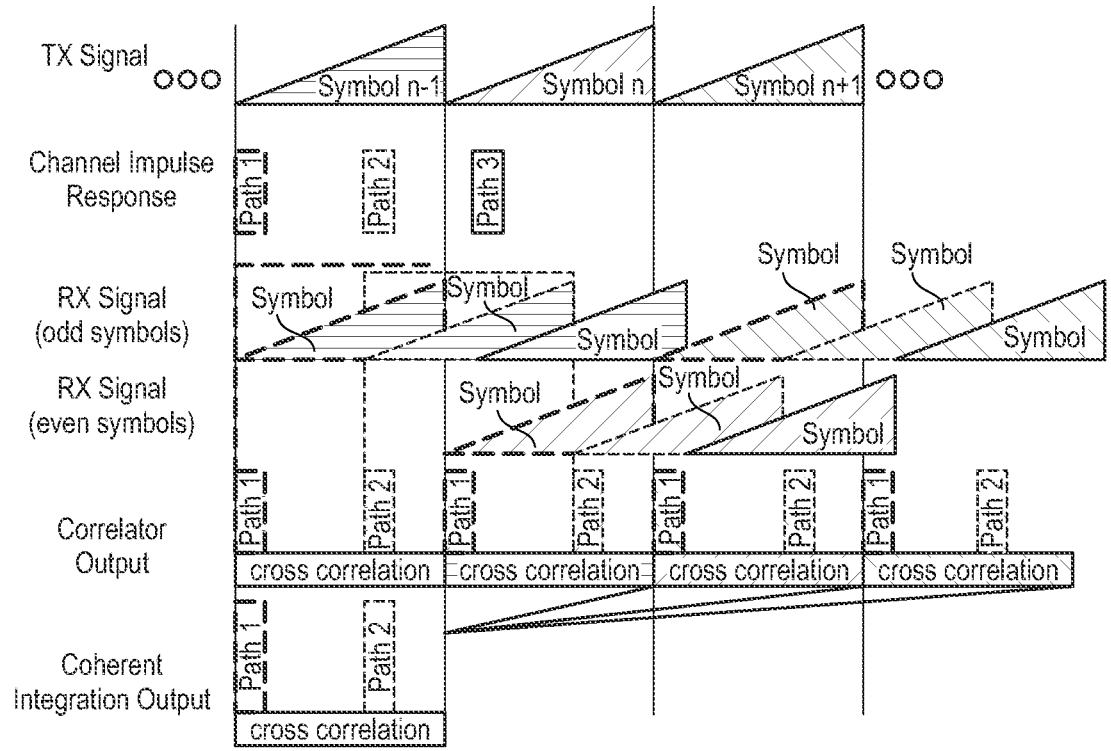
FIG. 5 shows an exemplary scheme of correlation and generation of correlation noise caused by non-ideal cross-correlation properties of the used symbols, according to exemplary embodiments of the present disclosure.

FIG. 5 is an exemplary scheme of correlation and generation of correlation noise caused by non-ideal cross-correlation properties of the used code symbols. Again, the first row shows the transmitter signal S. More precisely, there is shown a symbol n−1, then (to the right) a code symbol n, and then a subsequent code symbol n+1. The second row shows a channel impulse response (delay times $\tau_{max}$ of different targets) where path 1 and path 2 lie within an allowed duration and path three is either a reflection exceeding the maximum allowed delay time $\tau_{max}$ or a maliciously delayed signal. The third and fourth rows show the received code (received signal) caused by the three targets. The contour patterns of the triangles indicate which path caused the corresponding part of the received code, while the fill patterns indicate which transmit code symbol caused the part of the corresponding received code. For better readability, even and odd code symbols have been split into two rows, although the receiver observes the sum of all the triangles as a single receive signal. The fifth row shows the output of the correlator using the received signal (sum of triangles from row three and four) and the correlation templates corresponding to the transmit signals in row one. The correlation templates are switched at the times indicated by the thin vertical lines between the different code symbols in row one. The correlation output in row five shows that path three (too long delay time $\tau_{max}$ or maliciously delayed path) does not produce a correlation peak, which means it is not detected. Due to the non-perfect cross correlation properties of the codes used the overlap of reflections from different symbols causes additional noise indicated by the blocks "cross correlation". E.g. for column three (TX symbol n+1) the correlation template R(n+1) is used for the correlation. But in line three and four it can be seen that the reflections from preceding symbols overlap with the reflections of symbol n+1.

Because the preceding symbols do not match the currently used correlation template for symbol n+1, they are not detected as peaks, but as the cross-correlation properties of the codes are not ideal (which means the cross correlation produces an output unequal to zero, or the magnitude of the cross-correlation output is bigger than zero), additional noise power is added to the correlation output. In line six, the correlation results of the individual code symbols are summed (i.e. coherent integration). As the correlator output for path 1 and path 2 is the same for all code symbols, but the correlation noise varies between symbols, the signal-to-noise ratio (SNR) is increased (the level of path 1 and path 2 increases by a factor of $N^2$ while the cross-correlation level only increases by N, N being the total number of code symbols transmitted by the transmitter 120. This leads to a SNR increase of N due to the coherent integration).

Figure 6:
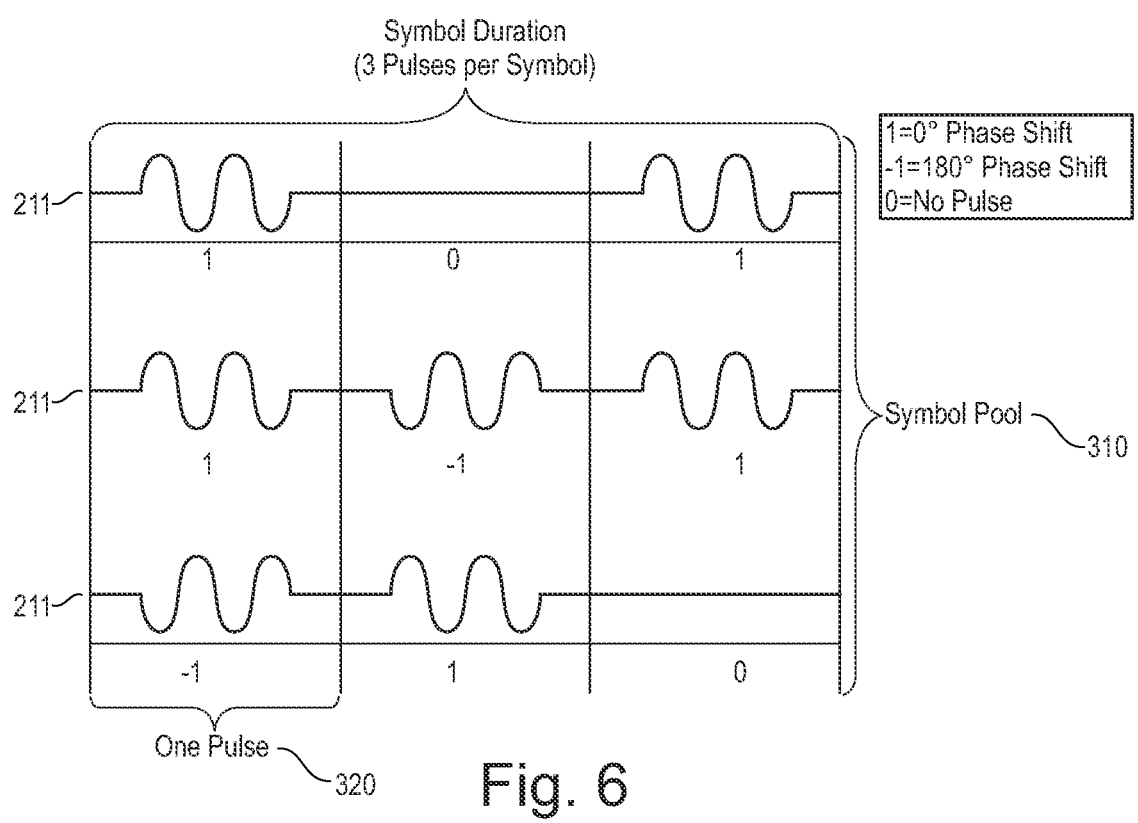
FIG. 6 shows an exemplary representation of three different code symbols based on a ternary system.

FIG. 6 shows an exemplary representation of three different code symbols 211 based on a ternary system. The three different code symbols together form an exemplary symbol pool 310. In this example, the transmitter would transmit three pulses per symbol. In the illustration of FIG. 6, there are shown three columns and three rows, wherein the rows each contain one symbol and wherein each column contains one pulse for the respective symbols. The ternary nature of the symbols is represented by three different types of pulses: 0 corresponds to no pulse, 1 corresponds to a phase shift of 0°, and −1 corresponds to a phase shift of 180°. Hence, the three code symbols 211 of the code symbol pool 310 differ from each other while having the same length. The symbol pool 310 could possibly comprise 27 symbols when using a ternary system and three pulses per symbol. In other examples, one code symbol 211 may be represented by less or by more than three pulses.

In this specification, embodiments have been presented in terms of a selected set of details. However, a person of ordinary skill in the art would understand that many other embodiments may be practiced which include a different selected set of these details. In particular, embodiments described with respect to a device or system may be practiced with respect to a method, and vice versa. It is intended that the following claims cover all possible embodiments.

REFERENCE NUMERALS

C Code to be transmitted
C' Received code
E Echo
O Correlator output
R Symbol template
R' Further symbol template
S Signal
$\tau$ delay time
$\tau_{max}$ maximum allowed delay time
100 Radar system
110 Control unit
111 Antenna
112 Further antenna
120 Transmitter
130 Receiver
140 Correlator
150 Radar Target
210 Sequence of code symbols
211 Code symbol
310 Code symbol pool
311 Random number generator

The invention claimed is:
1. A radar system, comprising:
 a control unit, configured for generating a code comprising a sequence of a plurality of code symbols, wherein generating the code comprises randomly selecting the plurality of code symbols from a code symbol pool;
 a transmitter, configured for generating a signal from the code, and further configured for transmitting the signal;
 a receiver, configured for receiving an echo of the signal; and
 a correlator, configured for correlating each code symbol of the code of the received echo of the signal to a code symbol of the code of the signal via a corresponding symbol template associated with the correlator, wherein a first symbol template corresponds to a first code symbol of the plurality of code symbols, and wherein a further symbol template corresponds to a subsequently transmitted second code symbol of the plurality of code symbols,
wherein the radar system is further configured for synchronizing the corresponding symbol template to the code of the signal.

2. The radar system according to claim 1,
wherein each code symbol of the plurality of code symbols comprises a sequence of encoded bits with a predefined length, and
wherein all code symbols have the same length.

3. The radar system according to claim 2, wherein the code symbols of the code symbol pool differ from each other.

4. The radar system according to claim 2, wherein the code symbols of the plurality of code symbols are based on one of a binary system, a ternary system, and a higher order system.

5. The radar system according to claim 2,
wherein the sequence of code symbols comprises at least one pair of code symbols with optimized cross-correlation functions and optimized auto-correlation functions.

6. The radar system according to claim 2, further comprising:
a deterministic random number generator, configured for generating the sequence of code symbols in a pseudo-random manner based on a cryptographic key.

7. The radar system according to claim 2, further configured for digitally modulating a radar signal, wherein the digital modulation is one of phase-shift keying, frequency-shift keying, amplitude-shift keying.

8. The radar system according to claim 1, wherein the code symbols of the code symbol pool differ from each other.

9. The radar system according to claim 1, wherein the code symbols of the plurality of code symbols are based on one of a binary system, a ternary system, or a higher order system.

10. The radar system according to claim 1,
wherein the sequence of code symbols comprises at least one pair of code symbols with optimized cross-correlation functions and optimized auto-correlation functions.

11. The radar system according to claim 1, further comprising:
a deterministic random number generator, configured for generating the sequence of code symbols in a pseudo-random manner based on a cryptographic key.

12. The radar system according to claim 11, wherein the deterministic random number generator uses AES, Advanced Encryption Standard.

13. The radar system according to claim 1, wherein the first symbol template and the further symbol template are stored in the correlator.

14. The radar system according to claim 13, further configured for synchronizing the symbol templates to the code of the signal transmitted by the transmitter by:
associating the first symbol template with the correlator before an echo of the first code symbol arrives at the receiver, and by
associating the further symbol template with the correlator before a further echo of the subsequent second code symbol arrives at the receiver,
wherein synchronizing the symbol templates to the code of the signal is carried out in a one-code-symbol-at-a-time-manner.

15. The radar system according to claim 1, further configured for digitally modulating a radar signal, wherein the digital modulation is one of phase-shift keying, frequency-shift keying, amplitude-shift keying.

16. The radar system according to claim 1, wherein the receiver further comprises a gating functionality, configured for sorting out an echo having a delay time ($\tau$) which exceeds a maximum allowed delay time ($\tau_{max}$).

17. The radar system according to claim 1, wherein the radar system is one of a pulse radar system and a continuous wave radar system, and wherein the radar system is configured for transmitting and receiving ultra-wide band, UWB, signals and echoes.

18. The radar system according to claim 1, wherein the code symbol pool comprises two or more different code symbols.

19. A radar method, comprising:
generating a code comprising a sequence of a plurality of code symbols by randomly selecting the plurality of code symbols from a code symbol pool;
generating a signal from the code;
transmitting the signal;
receiving an echo of the signal;
correlating each code symbol of the code of the received echo of the signal to a code symbol of the code of the signal via a corresponding symbol template, wherein a first symbol template corresponds to a first code symbol of the plurality of code symbols, and wherein a further symbol template corresponds to a subsequently transmitted second code symbol of the plurality of code symbols; and
synchronizing the corresponding symbol template to the code of the signal.

20. The radar method of claim 19, further comprising:
storing the first symbol template and the further symbol template in a correlator.

* * * * *